March 17, 1953 C. GOBEL 2,631,357
TOOL CARRIER AND TOOLHOLDER
Filed Sept. 13, 1950
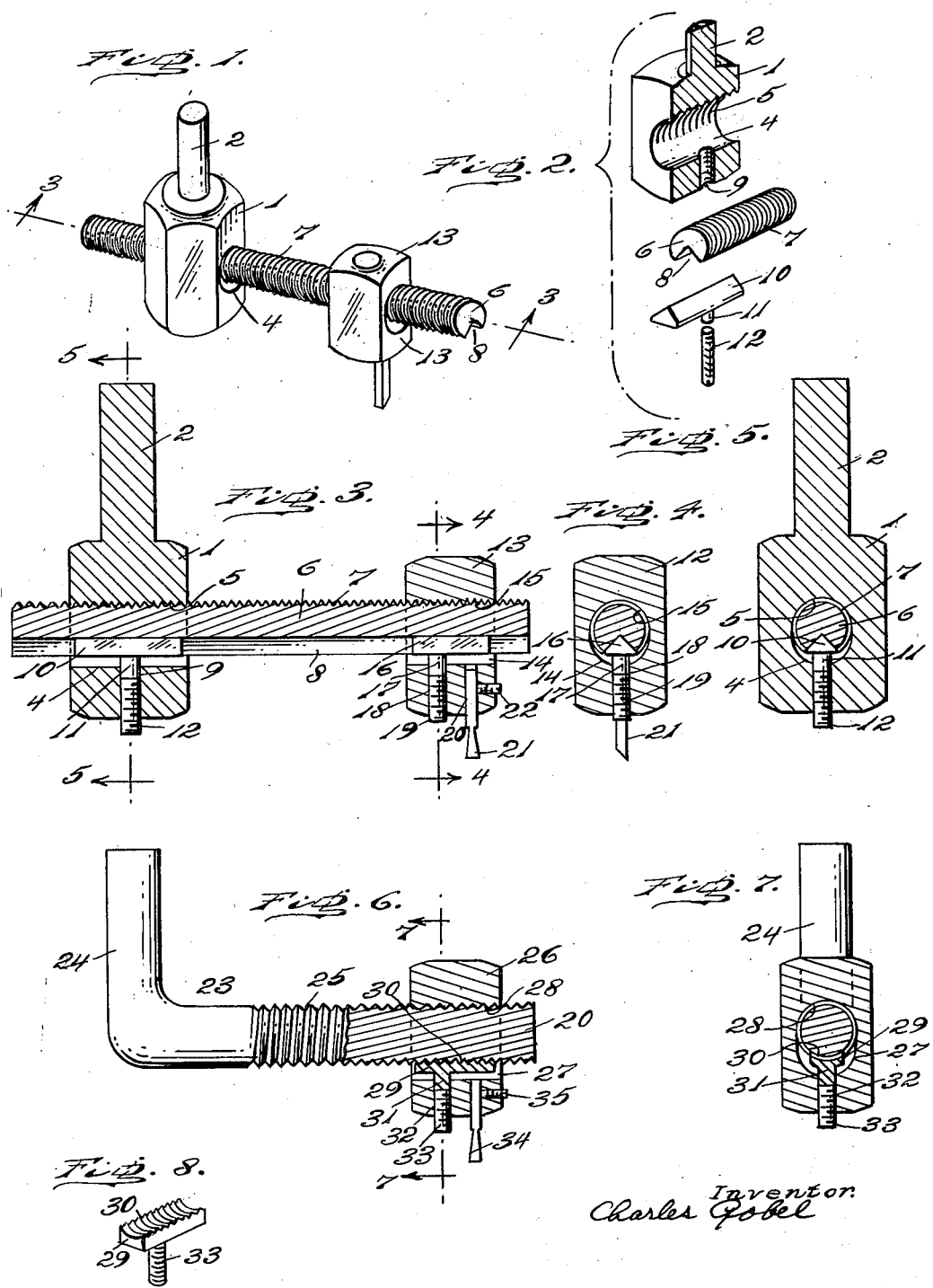
Inventor
Charles Gobel
Herbert S. Fairbanks
Attorney.

Patented Mar. 17, 1953

2,631,357

UNITED STATES PATENT OFFICE 2,631,357

TOOL CARRIER AND TOOLHOLDER

Charles Gobel, Philadelphia, Pa.

Application September 13, 1950, Serial No. 184,548

2 Claims. (Cl. 29—105)

The object of this invention is to devise a novel construction and arrangement of a tool holder carrier and tool holder, wherein provision is made for the rapid and accurate adjustment of the position of the working tool, and which will provide substantially the same rigidity as a one piece construction.

A further object of the invention is to devise a novel construction of a tool holder which carries the working tool and a novel construction of a rod with novel means to secure the parts in the relation to which they have been adjusted.

A further object is to provide a holder having a bore the upper portion of which only is threaded, the bore having a contour to provide a clearance for the rod, the rod being threaded, and novel means to clamp the threads of the rod to the threads of the bore. In some cases the rod has a longitudinally extending slot to receive a shoe mounted in the holder and a set screw is provided to effect the clamping action.

With the foregoing and other objects in view as will hereinafter clearly appear, my invention comprehends a novel tool holder carrier and a novel tool holder with novel means for securing such parts in the position to which they have been adjusted.

For the purpose of illustrating the invention, I have shown in the accompanying drawings preferred embodiments of it which I have found in practice to give satisfactory and reliable results. It is, however, to be understood that the various instrumentalities of which the invention consists can be variously arranged and organized and the invention is not limited to the exact arrangement and organization of these instrumentalities as herein set forth.

Figure 1 is a perspective view of a combine tool holder carrier and tool holder embodying my invention.

Figure 2 is an exploded view of component parts of the tool carrier.

Figure 3 is a section on line 3—3 of Figure 1.

Figure 4 is a section on line 4—4 of Figure 3.

Figure 5 is a section on line 5—5 of Figure 3.

Figure 6 is a side elevation partly in section of another embodiment of the invention.

Figure 7 is a section on line 7—7 of Figure 6.

Figure 8 is a perspective view of the shoe and set screw shown in Figure 6.

Similar numerals of reference indicate corresponding parts.

Referring to the drawings:

A tool holder carrier 1 in the form of a block having any desired contour is provided with an upwardly extending post 2 adapted to be received in a conventional chuck moved in a desired direction by suitable apparatus or machine. The block has a bore 4 which is oblong as shown in a vertical direction and substantially the upper half of the bore is threaded as at 5 and the remaining portion of the bore is unthreaded. Since the bore is oval or elliptical in cross section, it provides for the longitudinal adjustment therein of a rod 6 externally threaded as at 7 and provided with a longitudinally extending slot 8 opening through its outer periphery. This slot may have any desired contour in cross section and as shown is V shaped.

The block has an opening 9 extending through its bottom and into the bore, the upper portion of the opening being smooth and the portion beneath it being threaded. A shoe 10 has a stud 11 to fit the opening 9 and is shaped in cross section to conform to the shape of the slot 8 and is provided with a flat bottom. A set screw 12 in the opening 9 abuts against the stud 11 and preferably is provided with an Allen type head instead of the conventional kerf.

A tool holder 13 is longitudinally adjustable on the threaded rod 6 and has an oblong bore 14 similar to the bore 4, having only its upper half threaded as at 15. The rod 6 has a clearance in the bore 14. A shoe 16 has a stud 17 to fit an opening 18 in which a set screw 19 is threaded in a similar manner to that of the block 1. The tool holder 13 is apertured at 20 to receive a working tool 21 fixed imposition by a set screw 22.

In the embodiment seen in Figures 6 and 7, the tool carrier and rod are made integral and the rod has the threads extending around its entire periphery with the slot omitted. A rod 23 is angularly bent to provide a post 24 to be received in a chuck, and the rod is threaded as at 25. The tool holder 26 has an oblong bore 27 having only its upper portion threaded as at 28. A shoe 29 has its upper face curved and threaded as at 30 and is provided with a stud 31 extending into an aperture 32 to cooperate with a set screw 33. The working tool 34 is secured in an aperture in the holder by a set screw 35 in a similar manner to that shown in Figure 3. It will be apparent that the construction and arrangement of tool holder seen in Figures 6 and 7 can be used with a threaded rod separate from the tool holder carrier.

In the operation, the set screws 12, 19 or 33 are loosened and the tool carrier or tool holder are moved into the desired location along the rod and their respective set screw tightened to fix the position of the working tool.

The post 2 or 24 of the body portion or rod of the tool holder is secured in the chuck of a drilling machine, lathe or other type of machine which will cause the working tool to move in a desired direction relatively to the work.

Having thus described my invention, what I claim as new and desire to secure by Letters Patent is:

1. In a tool holder, a body portion having an upwardly extending post to be received in the chuck of a machine, said body portion having an opening oblong in cross section with its upper half threaded and its lower half unthreaded, and having an aperture leading outwardly from said opening with the outer portion of the aperture threaded, a threaded rod longitudinally adjustable in said opening and provided with a V-shaped slot opening through its ends and periphery, a shoe triangular in cross section fitting said slot and having a stud extending into said aperture, a screw in the aperture contacting the stud to move the rod to lock its threads with those of the body portion, and a tool holder mounted on the rod.

2. The construction defined in claim 1, wherein the tool holder has an oblong opening through it with the upper portion only threaded, a shoe within such tool holder and fitting the slot of the rod, means to move the shoe to move the rod into locking engagement with the threads of the tool holder, and a working tool carried by the tool holder.

CHARLES GOBEL.

REFERENCES CITED

The following references are of record in the file of this patent:

UNITED STATES PATENTS

| Number | Name | Date |
|---|---|---|
| 99,315 | Heermance | Feb. 1, 1820 |
| 781,314 | Tucker | Jan. 31, 1905 |
| 784,014 | Steel | Feb. 28, 1905 |
| 1,156,105 | Sleeper | Oct. 12, 1915 |
| 1,271,408 | Wood | July 2, 1918 |
| 1,404,296 | Howard | Jan. 25, 1922 |
| 2,475,668 | Krist | July 12, 1949 |
| 2,505,236 | Dooley | Apr. 25, 1950 |